July 31, 1962 T. D. HADNAGY 3,046,558
MACHINE FOR MANUFACTURING MERCHANDISE-SUPPORTING
PALLETS OR PLATFORMS
Original Filed Feb. 5, 1958 9 Sheets-Sheet 1
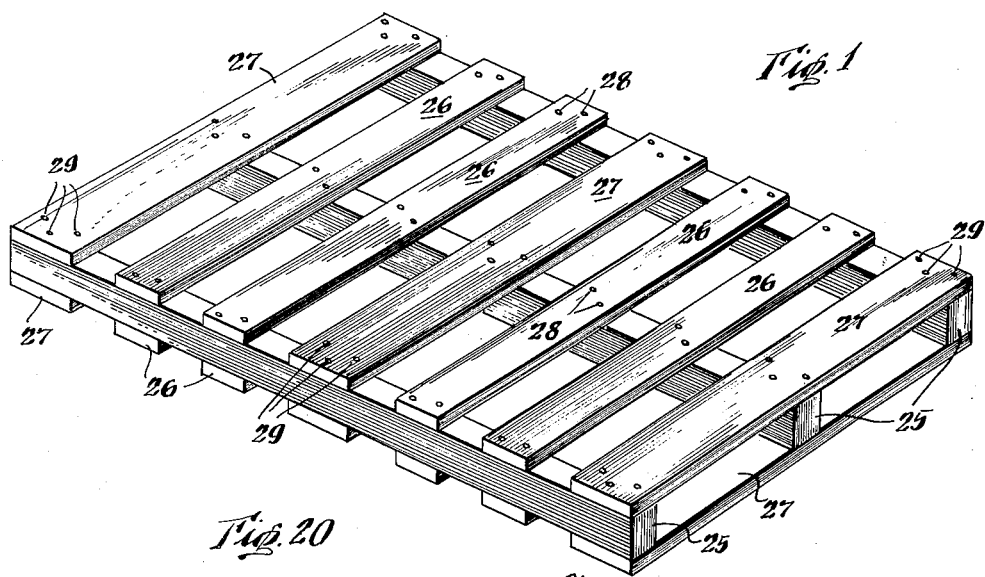
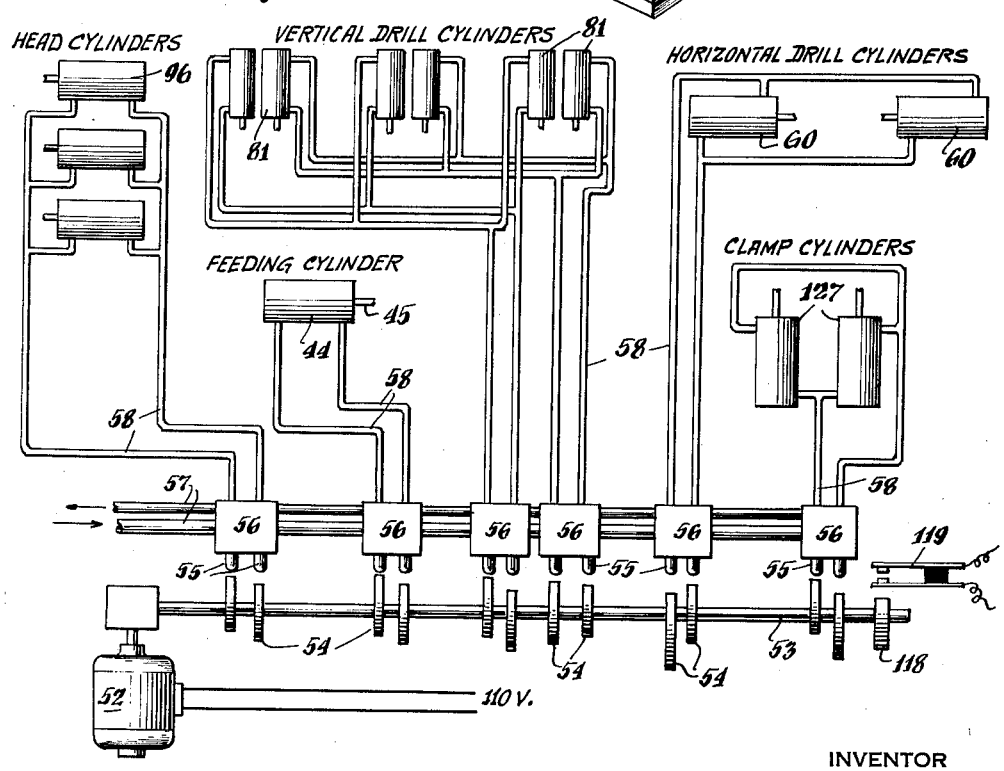
INVENTOR
Thomas D. Hadnagy
BY
Kane, Dalsimer and Kane
ATTORNEYS July 31, 1962 T. D. HADNAGY 3,046,558
MACHINE FOR MANUFACTURING MERCHANDISE-SUPPORTING
PALLETS OR PLATFORMS
Original Filed Feb. 5, 1958 9 Sheets-Sheet 2
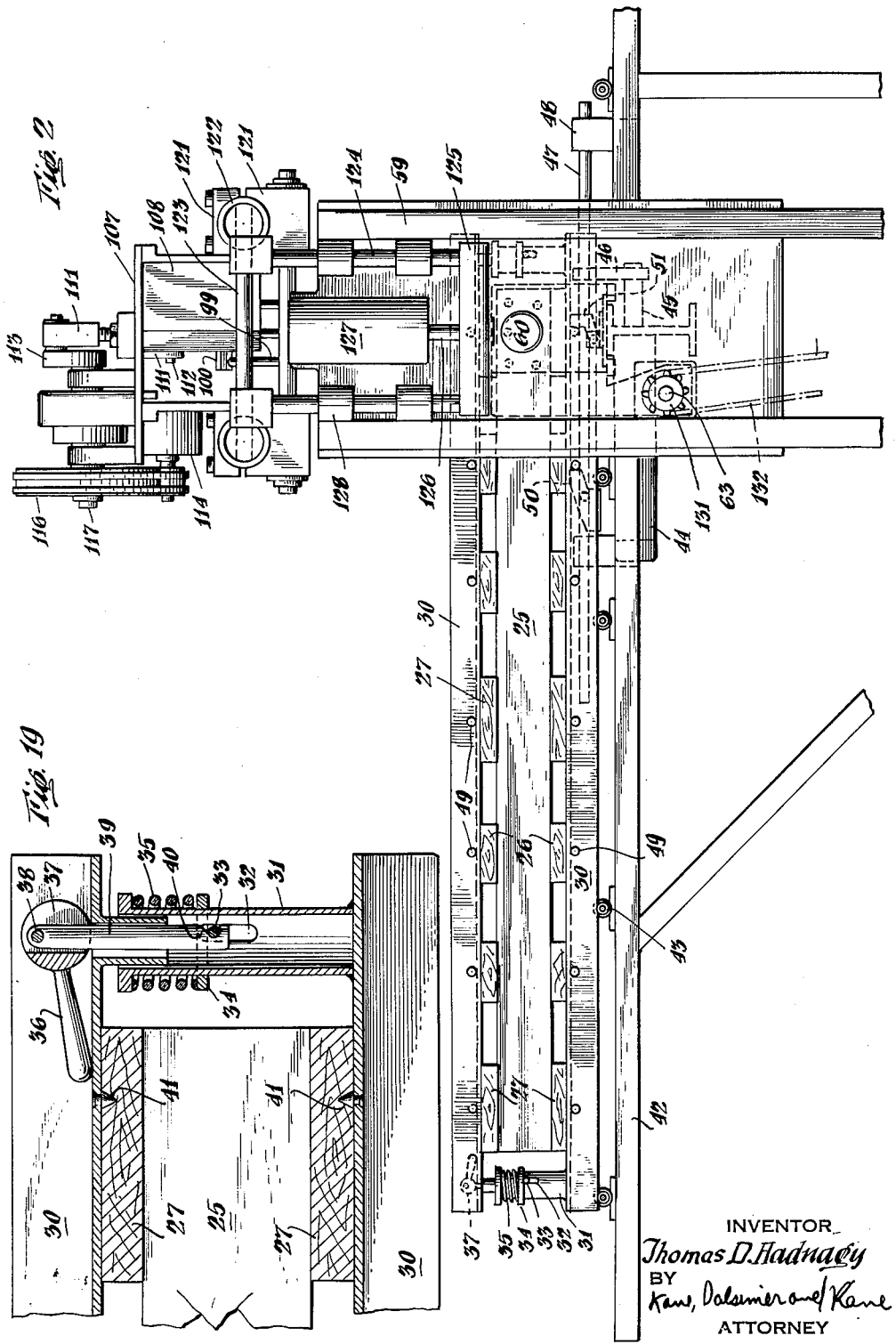
INVENTOR
Thomas D. Hadnagy
BY
Kane, Dalsimer and Kane
ATTORNEY

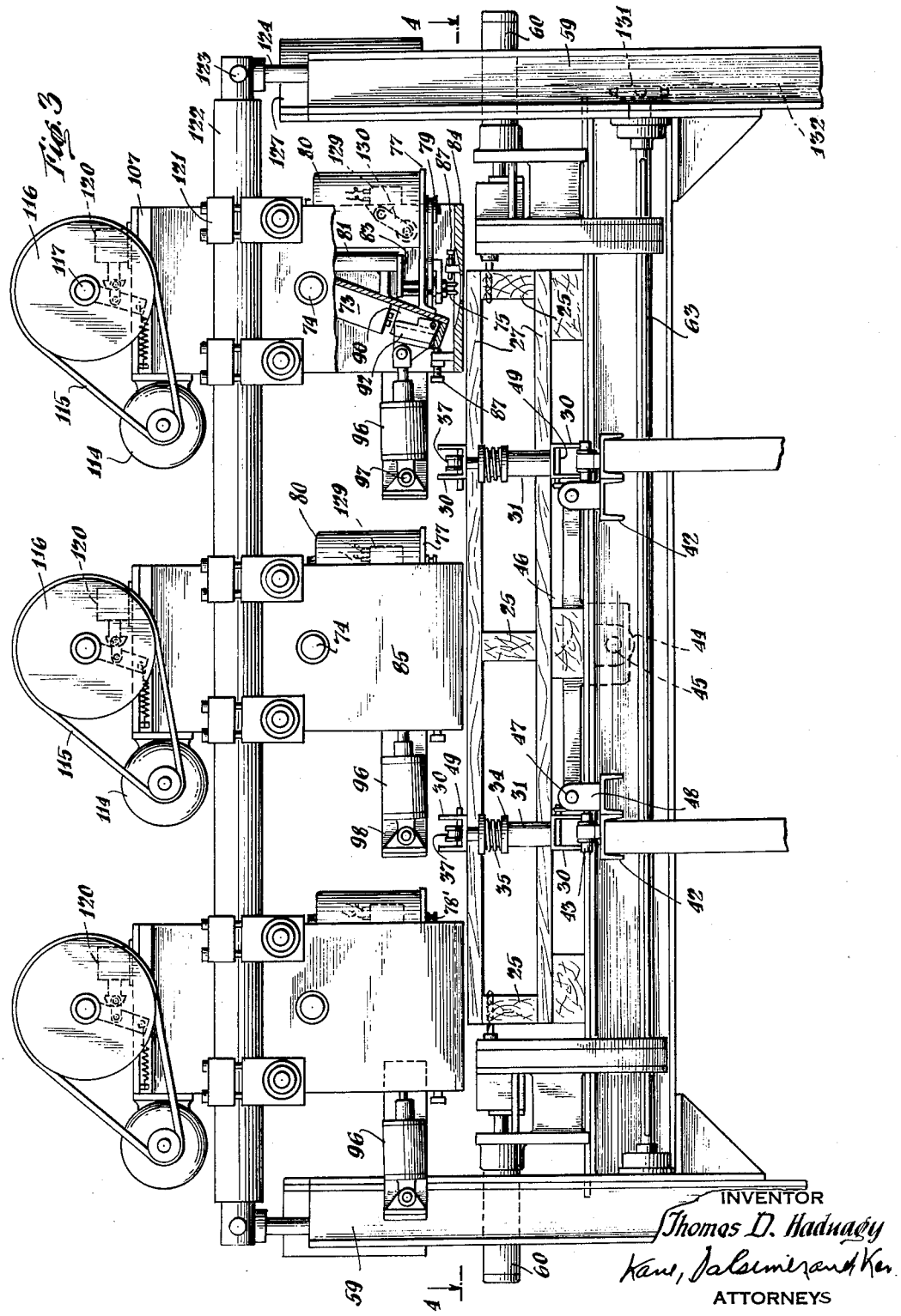

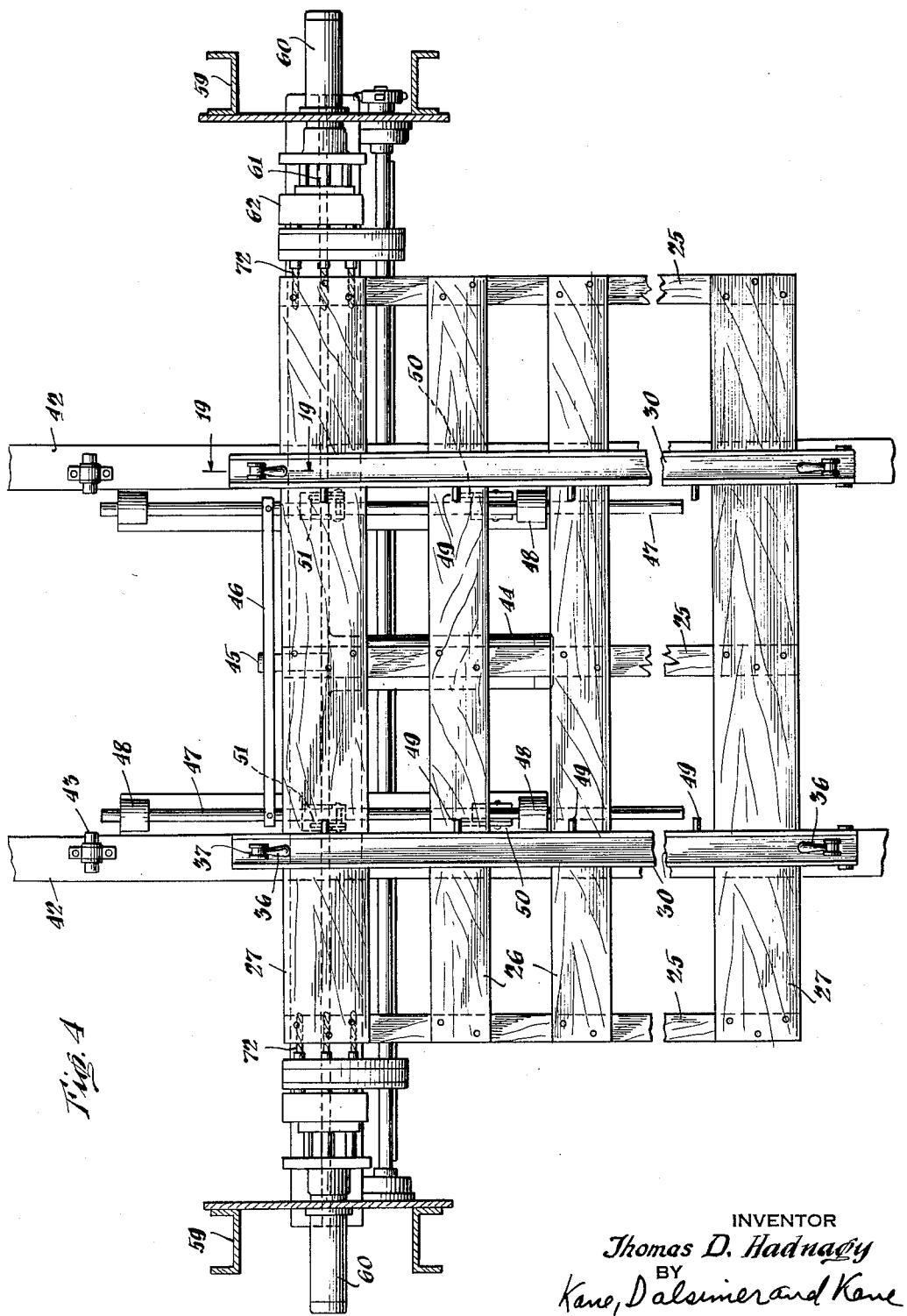

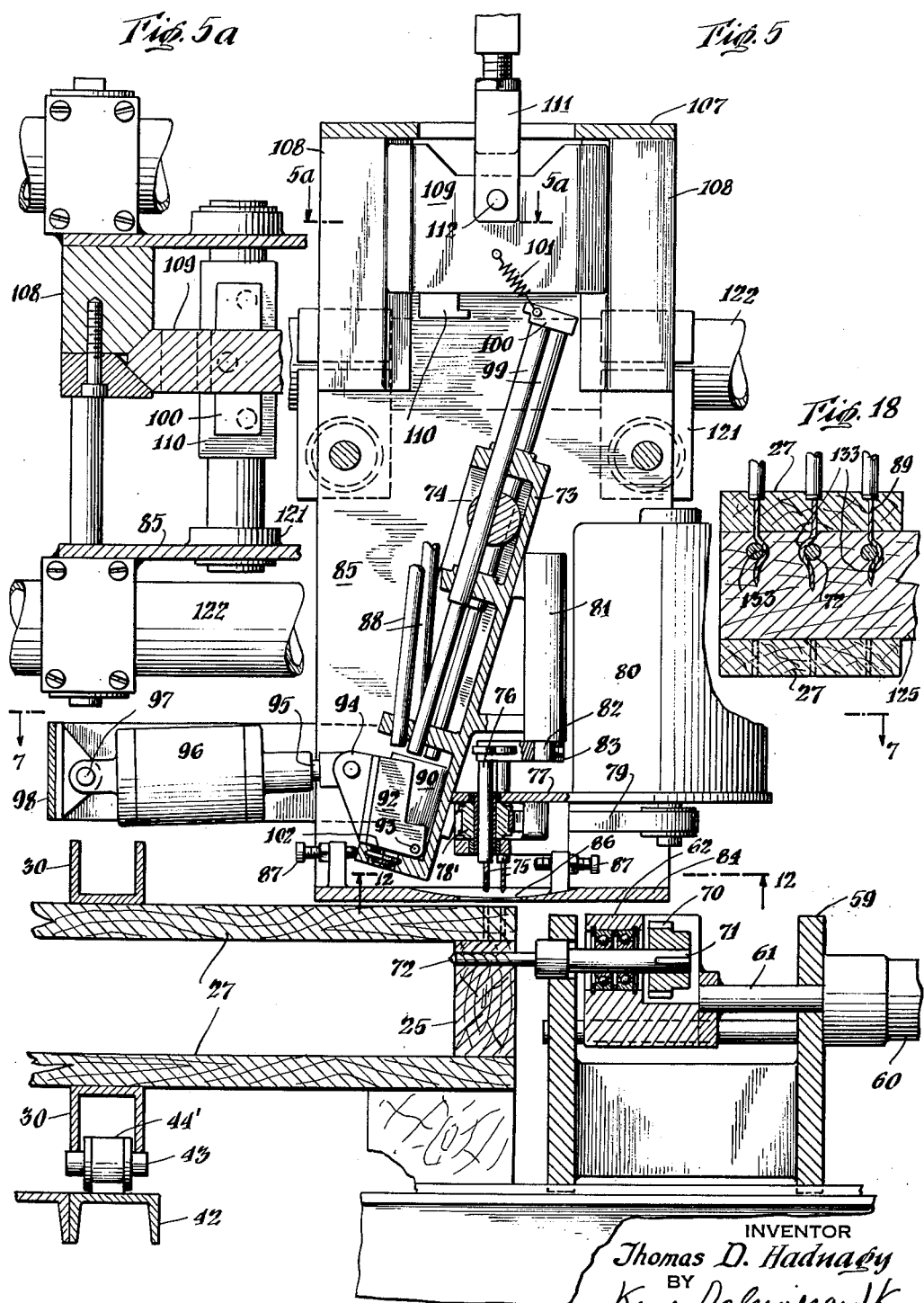

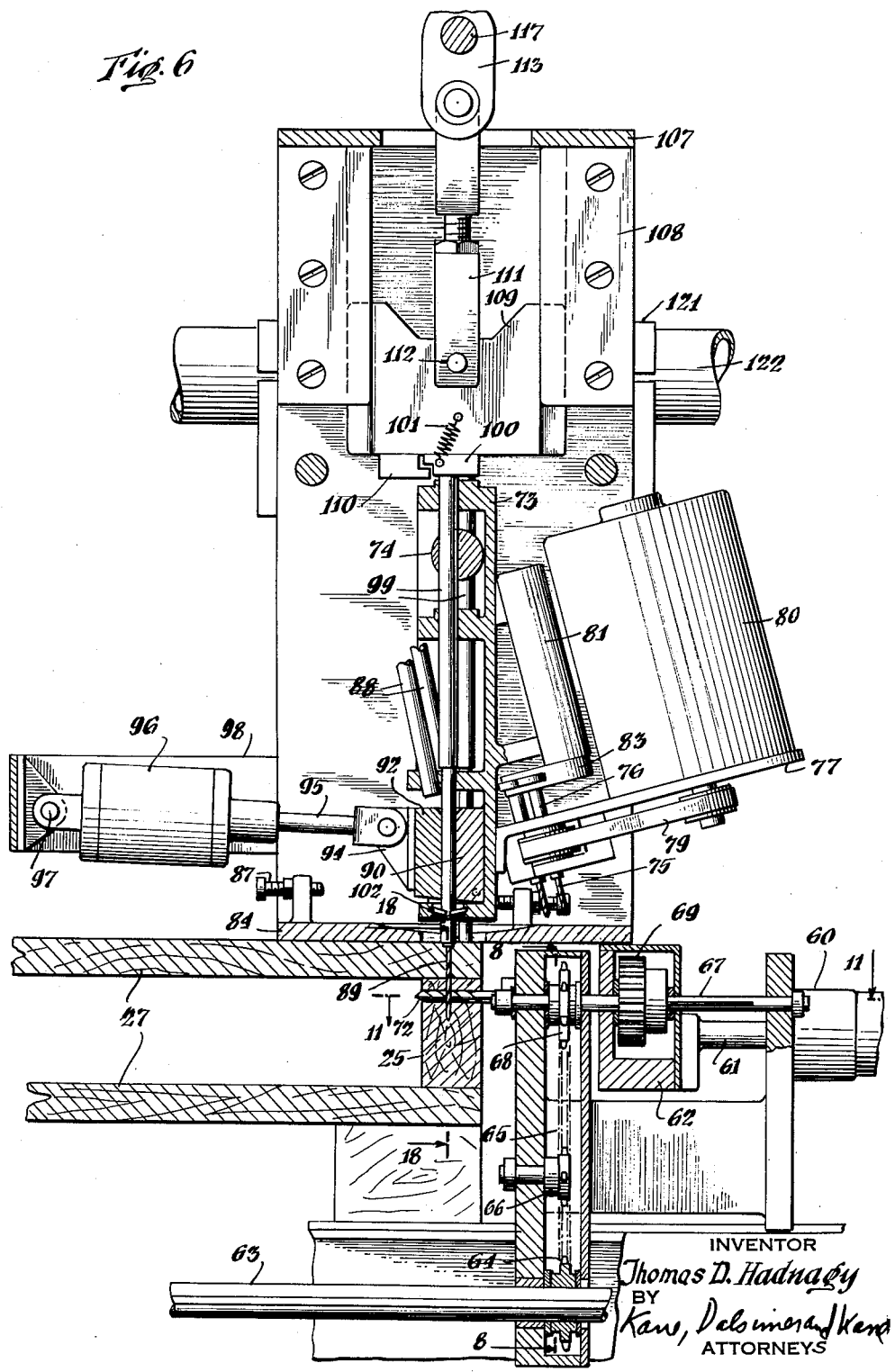

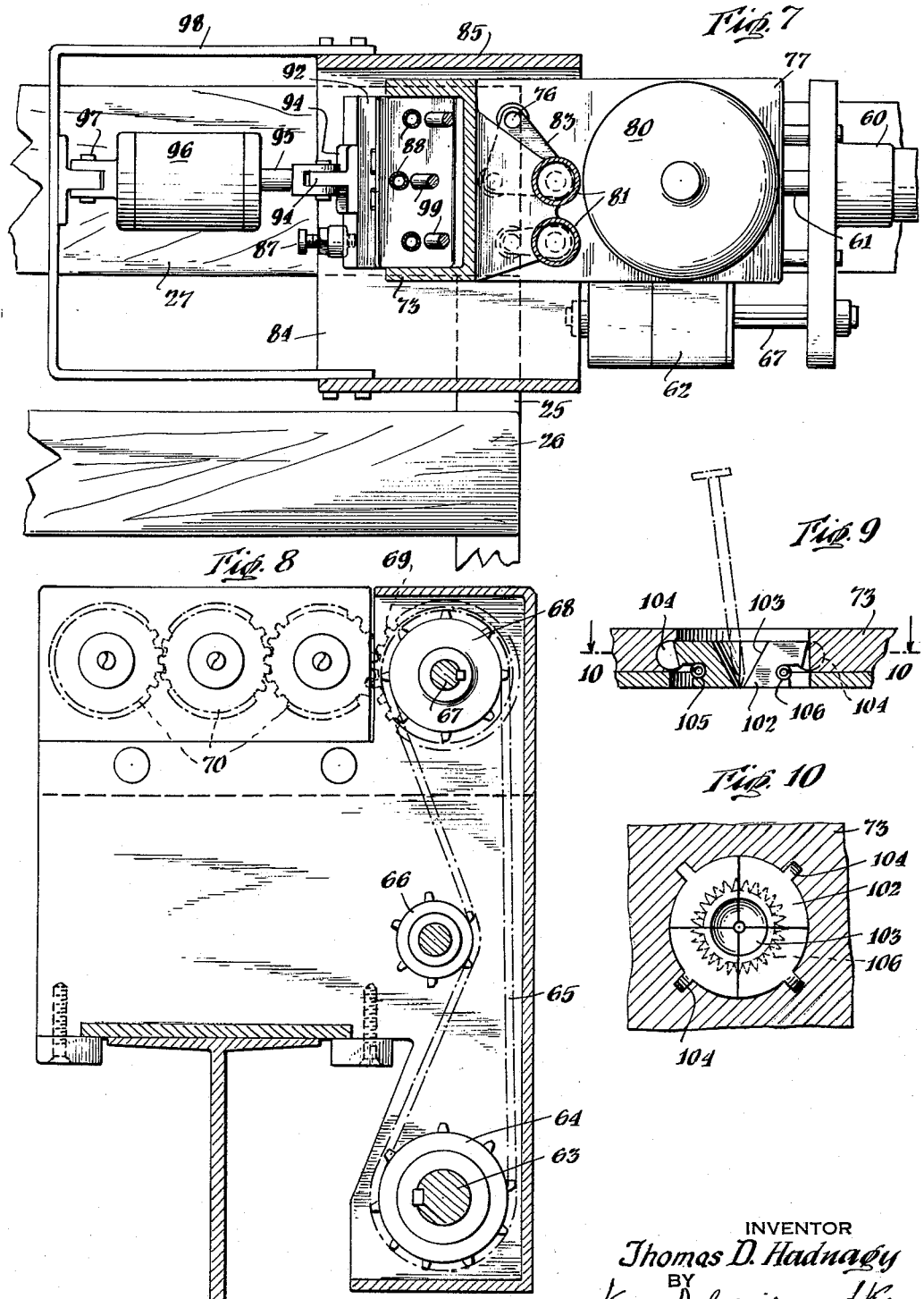

July 31, 1962 T. D. HADNAGY 3,046,558
MACHINE FOR MANUFACTURING MERCHANDISE-SUPPORTING
PALLETS OR PLATFORMS
Original Filed Feb. 5, 1958 9 Sheets-Sheet 8

INVENTOR
Thomas D. Hadnagy
BY
Kane, Dalsimer and Kane
ATTORNEYS

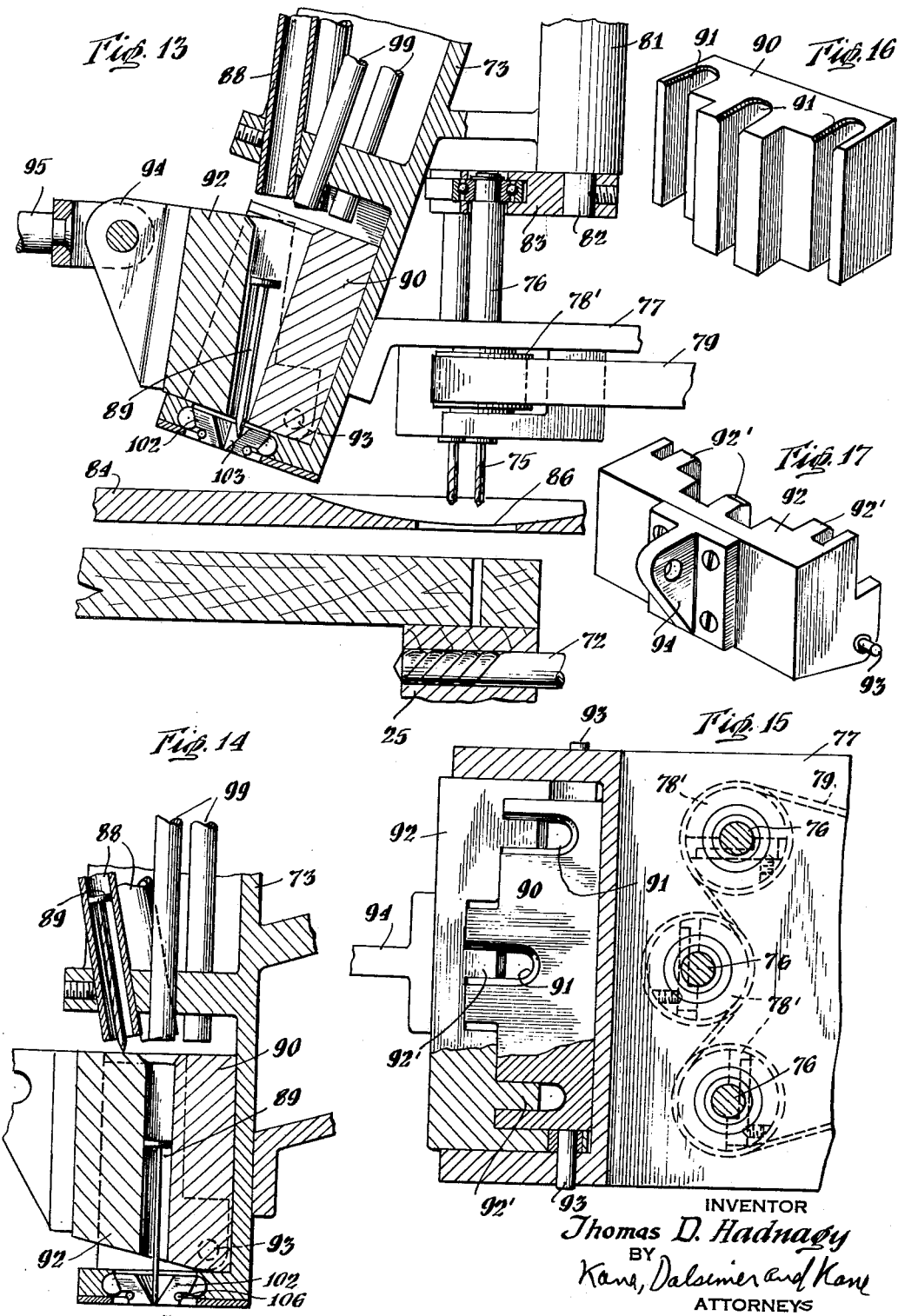

United States Patent Office 3,046,558
Patented July 31, 1962

3,046,558
MACHINE FOR MANUFACTURING MERCHANDISE-SUPPORTING PALLETS OR PLATFORMS
Thomas D. Hadnagy, 17 Briar Lane,
Roslyn Heights, N.Y.
Continuation of application Ser. No. 713,399, Feb. 5, 1958. This application Jan. 6, 1961, Ser. No. 81,669
3 Claims. (Cl. 1—302)

This invention relates to a structurally and functionally improved machine, by means of which merchandise-supporting pallets or platforms may be manufactured.

This application is a continuation of my prior application Serial No. 713,399, filed February 5, 1958 on "Machine for Manufacturing Mechandise-Supporting Pallets or Platforms" and now abandoned.

Supports of this nature commonly receive merchandise and may remain in positions upon floors or other mountings in convenient location, or—together with the merchandise—be arranged in the form of stacks for desired periods of time. They, together with the merchandise supported thereon, are shifted into the desired locations by means of power-driven dollies equipped with elevator structures usually embracing a series of tongues or blades. After the vehicle has been maneuvered into proper position, these blades are projected to underlie portions of the pallets or platforms and into supporting contact with surfaces thereof. Thereupon, the pallet together with the merchandise supported thereon, may be lifted free of a surface upon which it has heretofore rested and by means of the vehicle or dolly, the entire supported assembly is transported to a new location or station. At the latter, by a reversal of operation, the pallet and its merchandise are again properly associated with a supporting surface such as a floor, after which the blades or other elements of the elevator are withdrawn; the vehicle or dolly being now free to move to further locations.

These pallets or platforms include longitudinally extending units such as beams above and below which slats are transversely disposed. Heretofore, the elements of a given assembly have been secured together by a series of operations ordinarily involving the use of nails and a hammer. Assembled in this manner, it has been a relatively expensive operation to produce a platform. Also, after a certain amount of use, the nails have tended to pull free from the slats, beams or other supporting members.

By means of the present teachings, a machine is provided in which the number of manual operations to be performed is reduced to a minimum. Also, the desired assembly is achieved at relatively high speed. Accordingly, the expense of producing a dolly or platform is materially reduced.

Moreover, the units thus assembled will include a structure in which the component parts are secured against all probability of future movements with respect to each other. In other words, nails and other fastening elements will not pull free of the parts to which they are secured. Therefore, and quite aside from the fact that expensive platform replacements will not be frequently necessary, damage to supported merchandise will be minimized.

Additionally, by these teachings, a machine is provided which may be caused to function in an entirely proper manner by an operator possessing only nominal training and skills; the machine embracing relatively few parts, individually simple and rugged in construction and capable of assembly to furnish a unitary mechanism operating over long periods of time with freedom from all difficulties.

With these and other objects in mind, reference is had to the attached sheets of drawings illustrating a practical embodiment of the invention, and in which:

FIG. 1 is a perspective view of one form of pallet or platform producible by the machine;

FIG. 2 is a side elevation of the machine;

FIG. 3 is an end view thereof with certain of the parts broken away to disclose underlying structures;

FIG. 4 is a sectional plan view of the apparatus taken along the line 4—4 in the direction of the arrows as indicated in FIG. 3;

FIG. 5 is a partly sectional fragmentary view of an end portion of the assembly;

FIG. 5A is a transverse sectional view in enlarged scale taken along the line 5A—5A in the direction of the arrows as indicated in FIG. 5;

FIG. 6 is a view similar to FIG. 5 but showing the elements of the mechanism shifted to a different position;

FIG. 7 is a sectional plan view taken along the line 7—7 in the direction of the arrows as indicated in FIG. 5;

FIG. 8 is a sectional side view taken along the line 8—8 in the direction of the arrows as indicated in FIG. 6;

FIG. 9 is a fragmentary sectional side view of one of the nail-supporting elements;

FIG. 10 is a sectional plan view taken along the line 10—10 in the direction of the arrows as indicated in FIG. 9;

FIG. 13 is a fragmentary sectional side view of one of the units of the nail-feeding and bore-drilling assemblies;

FIG. 14 is a similar view of certain parts of the latter assembly and showing them in positions different from that illustrated in FIG. 13;

FIG. 15 is a partly sectional plan view of elements of the assembly as shown in FIG. 13;

FIGS. 16 and 17 show units of the nail-feeding and controlling elements;

FIG. 18 is a fragmentary sectional view in somewhat enlarged scale taken along the line 18—18 in the direction of the arrows as indicated in FIG. 6;

FIG. 19 is a fragmentary sectional side view taken through a part of the jig and along the line 19—19 in the direction of the arrows as shown in FIG. 4; and FIG. 20 is a somewhat diagrammatic view of the several drives and controls employed to assure a functioning of the components of the machine in proper sequence.

Figure 11:
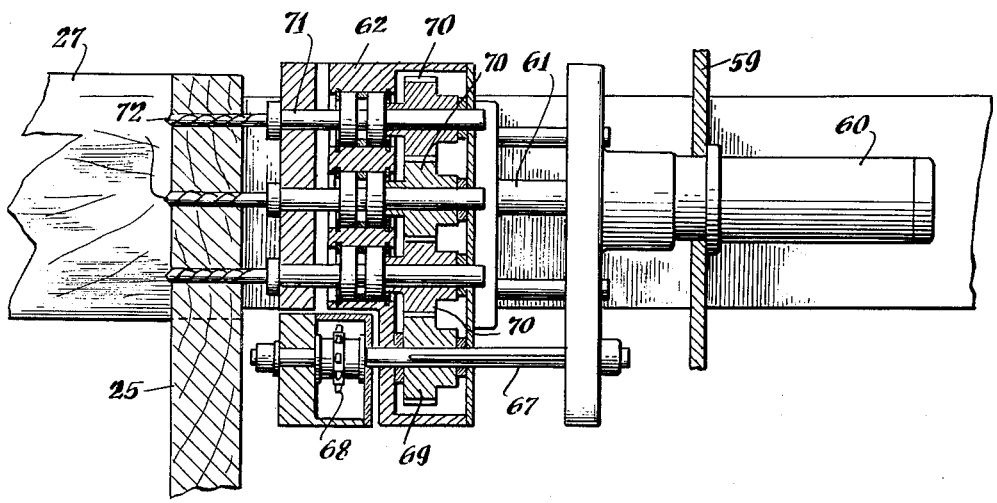
FIG. 11 is a sectional plan view taken along the line 11—11 in the direction of the arrows as indicated in FIG. 6.

Referring to FIG. 1, there has been shown one form of a dolly or platform such as is herein contemplated. That unit may conveniently embrace means 25 extending longitudinally of its body and conveniently disposed one adjacent each side edge of the platform with a third beam arranged equidistant between the first two sides. Slats or bars are disposed in spaced relationship with respect to each other and in the form of two series above and below the beams. Those slats have been indicated in FIG. 1 by the numerals 26 and 27. The former slats may be narrower than the latter which are conveniently arranged adjacent the ends of the beams and at a point midway of the length of the latter. Nails extend through the slats into the beam bodies. These nails as indicated at 28 may be arranged in the form of pairs. Otherwise, and as at 29, they may be arranged in the form of groupings of three.

While various materials may be employed to furnish the beams and slats, they are conveniently composed of wood. The beams 25 may actually comprise two-byfours. The slats will be formed of board sections of proper thicknesses. In no event should adjacent nails 28 of a pair, or 29 of a trio, be disposed in line with each other. In this manner, any tendency towards splitting will be avoided and maximum rigidity of the assembly will be assured. The foregoing is illustrative of one form of pallet. It is apparent that a greater or lesser number of beams 25 might be employed and the same is true of the slats. Additionally, the latter could be formed of similar widths of material. However, it is definitely preferred that a lower as well as an upper slat layer be utilized in the manner shown. Under these circumstances, the outer faces of the lower slats will rest against the floor or other supporting surface while the corresponding faces of the upper slat layer will support the superposed merchandise. Within the space between these slats, the prongs or blades of the elevator associated with the power-driven dolly may be freely received. As they exert a lifting action on the platform, these elements will bear against the lower faces of the uppermost row of slats so that the weight of the load will be evenly distributed without strain being exerted upon the platform in a manner such that the parts of that unit would tend to separate.

The elements of the platform or pallet are associated with a jig or carrying member. This has been shown to best advantage in FIGS. 2, 3, 4 and 19. It may conveniently include pairs of channel members 30 preferably formed of metal and bearing against the outer faces of the slats 26 and 27. Clamps are associated with the bars of an opposed pair. The assemblies of these clamps as especially shown in FIG. 19 may include a tube 31 united with and extending upwardly from one bar. This tube is formed with a slot 32 within which a pin 33 rides. That pin has its ends extending beyond the slot and engages a washer 34 against which the lower end of a compression spring 35 bears. The upper end of the spring is restrained by the flanged upper end of tube 31. A suitable crank structure is provided by, for example, employing a handle 36 connected to an eccentric 37 carrying a pin 38. The latter furnishes a point of pivotal connection of the upper end of a link 39 which has its lower end notched as at 40 to receive pin 33. At suitably spaced points, members 30 may carry inwardly directed retaining elements 41 which present points to penetrate the surfaces of the upper and lower series of slats and retain them against displacement.

Conveniently, and as shown in FIGS. 3 and 4, two pairs of these bars 30 are employed. It is apparent that an operator will arrange upon the surface of the lower bar a series of slats. Thereafter, he will dispose above the latter the desired number of beams 25 in their proper locations. In turn, above these elements, he will dispose the upper series of slats. The cranks of the upper bars 30 will be shifted to the opposite extreme positions from that shown in FIG. 19. Under those circumstances, links 39 are projectible into tubes 31 for a maximum distance. Therefore, no difficulty will be experienced in engaging the notches 40 or their equivalent with the pins 33 and thereafter shifting cranks 37 by means of handles 36. So shifted, tension will be exerted upon the pins 33 to shift the latter against the action of springs 35. The parts will finally assume the positions illustrated in the several figures. In those positions, the retaining elements 41 will penetrate the surfaces of the slats to retain the latter against displacement and to also retain the interposed beams 25 between these slats. The parts will remain in these positions during the entire operation of the machine and will only be released after the several beams and slats have been permanently secured to each other.

Supports 42 extend transversely of the machine. These supports mount rotatable shaft sections 43. The latter extend beyond the side faces of the mountings 44', as in FIG. 5. The width of the latter is such that they may extend within the space between channel members 30. Accordingly, a pair of the latter extending from the lower face of an assembly may bear against shaft 43 to be freely supported for longitudinal movement. Due to the fact that members 44 extend into the channels, the latter will be confined from moving in lateral directions. Therefore, as the jig and platform assembly move from the left to the right, as viewed in FIG. 2, it is apparent they will pass through the body of the machine.

To effect a deliberate shifting of the jig and the parts carried thereby, it is preferred to employ a cylinder and piston structure which is caused to operate by fluid under pressure. In the subsequent description, it will be apparent that similar power shifting mechanisms are employed to perform desired shifting operations. It will, of course, be appreciated that in lieu of such cylinders and fluid under pressure, other power mechanisms may be utilized which will properly perform the desired functions. The numeral 44 indicates the jig-feeding cylinder which preferably extends parallel to supports 42. This cylinder has operating within it a piston to which a rod 45 is secured. That rod, as in FIG. 4, mounts adjacent its outer end a bar 46 attached to rods 47. The latter are slidable within supports 48. Secured to the inner faces of members 30 are pins 49, spaced from each other a distance equal to the spacing between slats. Attached to each of bars 47 are trip or pawl members 50. The latter are capable of rocking movement with respect to the rods as shown in FIG. 2 and have their centers of gravity to the rear of their points of pivotal support. Therefore, these trips will normally assume a position in which their rear upper faces incline downwardly and their forward faces are in line with pins 49.

It follows that if the piston within cylinder 44 is caused to reciprocate, it will similarly move bar 46 and rods 47. During its rearward stroke, trips 50 will cam against the under zone of a pair of pins 49 to the left of the machine as viewed in FIG. 2. As the movement of the piston is reversed and after trips 50 have rocked in a counter-clockwise direction to have their forward faces in line with the pins 49 below which they have just passed, it is apparent that the forward faces of the trips or pawls will engage these pins. Therefore, the jig and the parts associated therewith will be shifted to the right. The amount of such shifting should be equivalent to the distance between slats and movement should be arrested when the ends of a pair of slats are in registry with the operating station of the machine. A detent such as 51 may be provided to prevent the jig from shifting to too great an extent.

With a view to controlling the operation of rod 45, a timing machine is provided. That mechanism may take one of numerous different forms; a schematic layout of one type having been shown in FIG. 20. In that view, the numeral 52 indicates a motor preferably of the electrical type, which by means of suitable gearing serves to drive a control shaft 53. Mounted upon that shaft are pairs of cams 54 which cooperate with actuating stems 55 extending from control housings 56. Connected to the latter is a supply line 57 for fluid under pressure. Branch lines 58 extend in pairs from each of the housings 56. One pair of these lines is connected to the opposite ends of cylinder 44. The actuators 55 are of course coupled to valves (not shown) which control the flow of fluid through lines 58. The various pairs of cams being properly timed with respect to each other and each embodying proper dwell and actuating portions, it follows that as motor 52 is operated, rod 45 will be periodically projected and retracted to thus intermittently advance the jib assembly and the members 25, 26 and 27 carried thereby.

The machine may include a frame assembly 59. This as shown in FIG. 2, extends vertically. The rods 47 extend transversely through this frame and serve to feed the jig in a similar manner. Cylinders 60 extend outwardly in opposite directions from the outer side faces of frame assemblies 59. As especially illustrated in FIGS. 5 and 6, rods 61 are connected to the pistons within the cylinders 60 and have their free ends coupled to housings 62. A suitably driven power shaft 63 is conveniently connected by a spline to a sprocket 64. Passing around the latter is a drive such as a chain 65, the links of which may also be engaged by a tensioning idler 66. A shaft 67 has fixed to it a sprocket 68 around which the chain or other drive 65 passes. This shaft is provided with a spline upon which there is slidably mounted a gear 69. The teeth of this gear are meshed with the teeth of an adjacent gear forming one of a series of three as indicated at 70 in FIG. 11. These gears are fixed with respect to drive shaft 71, mounted by housing 62. By means of chucks or other suitable expedients, drills 72 are secured one to each of the inner end portions of shaft 71. As will be apparent in FIG. 20, the horizontal drill cylinders 60 are controlled through feed lines 58 by projecting selectively a pair of actuators 55 through the medium of a cam assembly 54.

Figure 12:
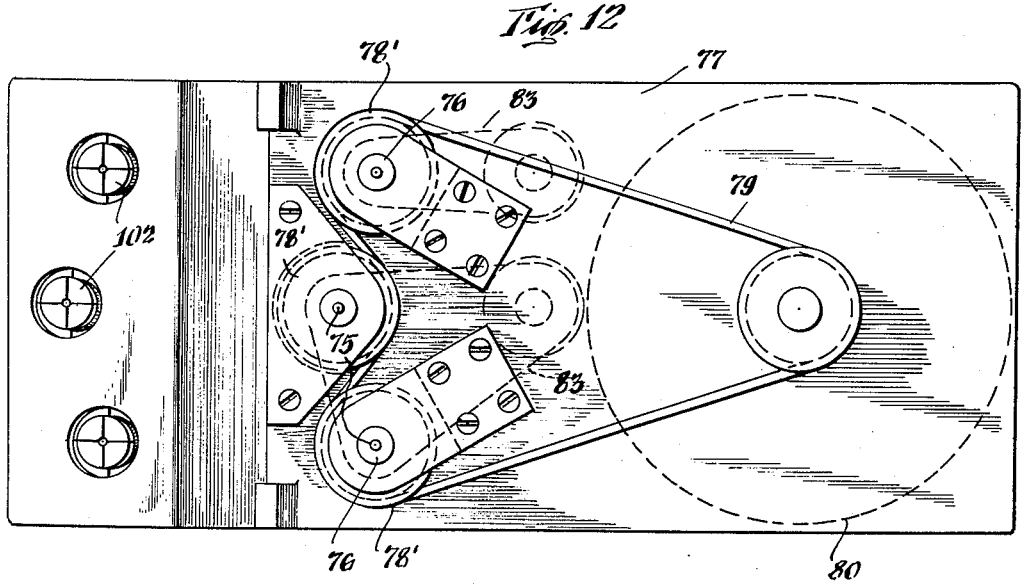
FIG. 12 is a bottom sectional plan view taken along the line 12—12 in the direction of the arrows as indicated in FIG. 5.

Next referring especially to FIGS. 3, 5 and 6, it will be seen that in the embodiment under consideration, the machine includes three head assemblies. Each of these embraces a head in the form of a flanged plate 73 mounted for horizontal swinging movement by a shaft 74. Drills 75 are suitably connected to shafts 76. The latter are slidably supported by bushings carried by a plate 77 which is attached to head plate 73. A drive pulley 78' (FIG. 12) is attached to each of the bushings and caused to rotate by a belt 79, coupled to the power shaft of a motor 80. As especially shown in FIG. 12, each of the assemblies preferably embraces three of the drive shafts 76 with their attached drills 75.

A control cylinder 81 is conveniently carried by the rear face of head plate 73. Its piston is connected to a rod 82. By means of a suitable bracket 83, the upper ends of shafts 76 are rotatably supported. It is apparent that when fluid is admitted to one end of a cylinder 81, bracket 83 will be projected to similarly move the group of shafts 76 and the drills 75 attached thereto. When retracted, as shown in FIG. 5, the ends of the drills will be above the slats 27. Similarly to the controls aforedescribed, cylinders 81 as in FIG. 20, are connected by lines 58 with housings 56 from which pairs of actuators 55 extend to be operated by the peripheral portions of cams 54 attached to shaft 53.

Disposed one adjacent the lower ends of each of the head plate assemblies are horizontally extending plates 84. These are supported between vertically extending members 85 and are provided with openings 86 with which drills 75 may be aligned. The movements of the head plates 73 around the pivots 74 are limited by stops 87. The latter are provided one to each side of opening 86 of a given plate. They engage with the opposite side faces of the head plate 73 with which they are associated.

In order to supply fastening elements such as nails with the assembly of beams 25 and slats 26 and 27, each head plate 73 carries feeding tubes 88. The latter are connected at their upper ends to a source of supply of securing elements which preferably takes the form of a hopper or hoppers filled with nails and provided with one of a number of suitable mechanisms by means of which these fastening elements are fed sequentially into the tubes at properly timed intervals with their points extending downwardly and their head portions upwardly. Suitable nails for this purpose have been indicated by the reference numeral 89.

A nail guiding assembly is provided below tubes 88. As shown especially in FIGS. 13 to 17, it includes a block 90 formed with three grooves 91 in its outer face. That block is carried adjacent the lower end of head plate 73. Pivotally mounted with respect to that plate is a second block 92 formed in the face of adjacent block 90 with grooves which provide outstanding portions 92' entering the recesses 91 when block 92 is swung around its pivot pins 93 conveniently bearing in the side faces of plate 73. When the block 92 has been swung around its pivots 93 in a counterclockwise direction, as viewed in FIG. 13, a series of tapering recesses are furnished incident to the notches or grooves 91 and the projecting portions 92' and the upper ends of which may receive articles discharged by the tubes 88. When block 92 is swung in a clockwise direction around its pivots 93, then as illustrated especially in FIG. 14, the troughs or passages provided between the adjacent faces of blocks 90 and 92 are constricted so that their upper ends no longer align with individual tubes 88. Under these conditions and as shown in FIG. 14, succeeding fastening elements such as nails 89 may be arrested from movement with respect to the guiding tubes 88 incident to their points bearing against the upper surfaces of block 92. To assure the desired relative movements of the blocks and also a swinging of head plate 73, each of the blocks 92 may have a connecting portion 94 extending from that face which is opposite block 90.

Pivotally coupled to the extensions 94 of each block 92 are connecting rods 95. The inner ends of the latter are coupled to pistons (not shown) within cylinders 96. Those cylinders are conveniently rockingly supported as at 97 by brackets 98 which may be attached to the side plates or supporting portions 85. Each of cylinders 96 as in FIG. 20 is connected by lines 58 with controls within housing 56. These controls are operated by an adjacent pair of cams 54 mounted by shaft 53. It is, therefore, obvious that as shaft 53 rotates, fluid under compression will be introduced into one or the other end of each of the head cylinders 96. Accordingly, head plates 73 will be rocked around their pivots 74 within the limits defined by stops 87.

Slidably mounted by head 73 are pusher rods 99. The bodies of the latter are disposed preferably parallel to the base of each head plate and at an angle to the supplying tubes or chutes 88 such that if the axes of these elements were continued, they would intersect. The number of rods in a given group should correspond to the number of tubes. The upper ends of the rods may be connected by a plate 100. Conveniently attached to the latter is a spring 101, the upper end of which is supported in a manner hereinafter brought out. When block 92 has been shifted to a maximum extent in a clockwise direction, as shown in FIG. 14, the rods 99 will align with the openings defined between the base portion of notches 91 in block 90 and the extending parts 92' of block 92. In line with the passages defined between the cooperating blocks 90 and 92, the lower flange of plate 73 is formed with a number of openings. As shown especially in FIGS. 9 and 10, each of these openings is occupied by a nail-retaining and centering structure. Conveniently, the latter includes an annular body provided by an aggregate of four quadrant sections 102, the inner side edges of which are surfaced to furnish a cone-shaped trough portion 103. The adjacent edge portions of plate 73 are recessed to rockingly support beads or rounded zones 104 of sections 102 at points spaced 90° apart. Adjacent the base of each of these sections, an outstanding flange 105 may be furnished. A spring 106 conveniently encircles the sections at a point above the flange. Therefore, these sections are retained against detachment from each other and normally assume a position at which they provide a self-sustaining structure preventing the passage of nails or other fastening elements. It is obvious, however, that if sufficient pressure be exerted upon the head of the fastening element, the several sections will slightly separate as in FIG. 6 to not alone permit of the passage of the nail shank but also to allow the ends of pusher rods 99 to pass therethrough.

Now with a view to providing a mechanism, by means of which pusher rods 99 are reciprocated, it will be seen with particular reference to FIGS. 5 and 5A, that plates 85 are connected adjacent their upper edges by deck portions 107. Suitably supported between the plates and below those decks are members 108 providing in their inner faces V-shaped grooves within which the correspondingly contoured side edges of heads 109 ride. Secured to the under faces of these heads are plates 110 having surfaces complementary to the surfaces of plate 100 connecting the upper ends of rod 99. Also, the upper ends of springs 101 are secured to the heads 109. The lower ends of connecting links or rods 111 are pivotally coupled as at 112 to blocks 109. Their opposite ends are similarly connected to cranks 113. Motors 114 preferably of the electrical type, are mounted one adjacent each of the deck portions 107 and serve to drive belts 115 which pass around drive wheels 116. The latter are connected to shafts 117 which are continued to mount the cranks 113.

Electrical controls serving to energize motors 114 are conveniently furnished by associating them with shaft 53 as in FIG. 20. One convenient form of control would embrace a cam 118 directly attached to that shaft and serving to operate a circuit breaker 119. The latter, by suitable leads (not shown) would couple the motors mounted by the heads with a suitable source of electrical current supply. So coupled, they would serve to rotate shafts. That rotation would be limited to a single revolution by, for example, employing a suitable form of control 120. Thus, this control would disconnect the motor with which it was associated from the source of current supply and would reset by suitable switch mechanism the electrical circuit so that after switch 119 was again closed, each motor 116 would not alone begin to function but would remain in operating condition until shaft 117 had traversed a revolution. During such revolution, crank 113 would project and retract links 111 and head 109.

The base plate 84, side plate 85 and deck 107 of each head assembly are supported for bodily movement with respect to the frame 59. In such movement, they are shifted in a direction normal to the plate of the platform assembly. So moved, they will carry with them the motors 114, head plate 73, motors 80, cylinders 81 and the several other parts heretofore described as being directly or indirectly supported by the head. To obtain this result, supports 121 may be suitably affixed to plate 85 and engage horizontally extending members 122 which project beyond the side faces of the machine. At the latter point, members 122 are connected to cross-bars 123 carried between the ends of a pair of rods 124. These rods are connected at their lower ends by a cross-bar 125 secured to a piston rod 126 extending into cylinder 127. Guides 128 are mounted by frame 59 and cooperate with rods 124. Cylinders 127 are supported by the frame 59. It is, therefore, obvious that with fluid under pressure introduced into cylinder 127, the piston within the latter will be raised to elevate bar 125. The latter will shift rods 124 upwardly with respect to guides 128 and thereby raise the connected supported structure 123, 122 and 121. This will correspondingly elevate the plate 84 of all head assemblies. Accordingly, the lower face of the latter will amply clear the upper surfaces of slats 26 or 27. When lowered, plate 84 may rest in contact with the upper face of a given slat and clamp the latter against the edge surface of a supporting beam 25. This will assure against any movements occurring between the parts which are to be secured with respect to each other and especially between those parts and plate 84.

As shown in FIG. 20, clamp cylinders 127 are connected by lines 58 with a housing 56 having actuators 55 extending therefrom and cooperable with cams 54 secured to shaft 53. Therefore, as the latter rotates, the flow of fluid into one or the other end of cylinders 127 is controlled in properly timed sequence. To also control the operation of motors 80 and as indicated in FIG. 3, switch units 129 may be carried by each of the motors and have actuating arms 130 extending from them. As a given head plate 73 is rocked around its pivot 74, the end of an actuating arm 130 will be caused to shift by contacting a suitable and relatively moveable surface. (In other words, a conventional cam-actuated switch assembly is present.) With that shifting, the switch elements with a unit 129 will either open or close the circuit. Therefore, it will not be necessary for motors 80 to be operating constantly. Rather, they will be energized merely when the drills 75 operated by them should be rotated at high speed in order to perform their alloted functions. Finally, it will be noted that shaft 63 may be driven by having attached to its body a sprocket 131 from which a chain or driving element 132 of suitable character extends to a continuously or intermittently operated power source.

Considering the operation of the apparatus, it will primarily be assumed that the magazines, hoppers, or other assemblies employed to supply nails or their equivalents to tubes 88 have been charged and are in proper operating condition. It will also be assumed that the jig assembly has received beams 25 and slots 26 and 27 disposed in proper relationship with respect to each other and that the clamps of the jig have been tightened so as to retain the platform parts against displacement. Moreover, it will be assumed that the jig has been disposed upon the supports 43 and with the clamping cylinders 127 through the introduction of fluid under pressure have raised the bars 125 and, consequently all of the head assemblies, to an elevated stage such that plates 84 clear the upper surface of an initial slat 27. Under these circumstances, that slat and the adjacent jig portions may be moved to the operating station of the machine, generally defined by the centers of the side frames 59. Also, it will be assumed that three beams 25 are employed in a platform. If a greater number are utilized, then a greater number of head assemblies will be present than the three shown in FIG. 3. If, alternatively, only two beams 25 are employed adjacent the opposite side edges of the platform, then the central head assembly may be rendered inoperative or completely eliminated. The operation of the machine will be initiated by energizing motor 52 to turn shaft 53 and thus control the flow of fluid into and from the several cylinders and to additionally control the operation of motors 114.

Under these circumstances, cylinders 127 will initially lower plates 84 into contact with the upper surfaces of slats 27. Head cylinders 96 will maintain plates 73 in the positions shown in FIGS. 5 and 13. Thereupon, cylinders 60 will be energized to cause a projection of the drills 72 through beams 25, adjacent the upper edge zones of the latter as in FIG. 5. Substantially simultaneously, cylinders 81 will be energized to project drills 75 to furnish perforations in the uppermost end slat 27 in line with the edge of underlying beams 25. With the horizontal drill cylinders 60 maintaining drills 72 in projected positions, cylinders 81 will now cause drills 75 to be retracted from the bores which they have produced.

Thereupon, head cylinders 96 will be energized to swing head plates 73 around their pivots 74. Prior to such swinging occurring, nails 89 will be deposited within the notches 91 of block 90. With plates 73 shifted by head cylinders 96, block 92 will shift toward block 90 as shown in FIG. 14. This will confine the nail 89 within a given bore and serve to align its point with the central conical trough 103 as shown in FIGS. 9 and 10. As plate 73 engages the right hand stop 87 as viewed in FIG. 6, it will extend perpendicular to the platform. Therefore, pusher rods 99 will extend in similar directions. Under these circumstances, the ends of those rods will be aligned with the upper ends of the bores or passages defined between the facing surfaces of blocks 90 and 92. This has been illustrated in FIG. 14 in which there had additionally been shown the fact that succeeding nails 89 have under these conditions been delivered through tubes 88 and are conveniently arrested from further downward movement by bearing against the upper surfaces of the blocks 94.

Motors 114 are now caused to operate by the switch 119 or other suitable control being energized. As shown particularly in FIG. 6 with plate 73 in a perpendicular position the head portion or plate 100 connected to the upper ends of rods 99 will be engageable with the flat under face of head 109. The latter will be projected by means of the crank 113 and connecting link 111. With such projection, rods 99 will be similarly moved as a group to enter the bores between blocks 90 and 92, engage the head of the fastening elements 89 and force the latter through the openings provided in slat 27 and so into the beam 25. These drill openings have their axes intersecting the axes of drills 72 which remain in projected positions as in FIG. 6. Therefore, the pointed ends of the nails will engage the upper surfaces of these drills as in FIG. 18 and be diverted by them. In such diversion, it has been found that the point of each nail, instead of continuing at an angle to the axis of rods 88, will actually "flow" around a drill 72 against which its point has cammed. It will thereupon continue to move in a downward direction into the beam 25 to form what might be termed a "hump portion" 133 in the nail shank. Obviously, that portion will prevent any subsequent movements on the part of the nails either with respect to the slats 27 or beams 25.

Head cylinders 96 may at this time return head plates 73 to inclined positions such as has been shown in FIGS. 3 and 5. Substantially at the same time, the horizontal drill cylinders 60 will have been energized to withdraw the drills 72 from the beams 25. Also, the clamp cylinders 127 will have been actuated to lift plate 84 out of proximity with the upper surface of the slat. With the return of plates 73 to their inclined positions, the nails 89 which have heretofore been bearing against blocks 92 will—with the separation of that block from block 90 as in FIG. 13—drop into the openings or notches 91. Under these circumstances, they will bear against the side surface of the cone shaped troughs 103 defined by elements 102. Feeding cylinder 44 will now be actuated to advance the jig and parts retained thereby to a point where the first slat 26 is in line with the operating station of the machine. At that point, further movements will be arrested. Now the entire cycle of operation will be repeated.

This operation will continue throughout the several cycles necessary to secure the series of slats 27—26 to the beams 25. It will be noted, as especially illustrated in FIG. 1, that it is preferred to effect such securing by two nails in connection with slats of the type indicated at 26 and by three nails to slats of the type indicated at 27. It is apparent that the nail feeding mechanism connected to tubes 88 might be controlled to merely feed nails through two of these tubes when slats of the type shown at 26 are in alignment with the head of the machine. Otherwise, all slats may be secured in position by, for example, three nails. Alternatively, a third nail could be fed but would simply drop to one side of slats of the narrow type. As afore brought out, the nails passing into the side beams are "humped" or "kinked." With these elements thus secured, it is apparent that a similar expedient does not have to be resorted to in connection with the center beam 25. This will be because even if the latter is employed, its fastening elements will remain in position due to the fact that the ends of any given slat are held against any probability of separation from the bodies of the side beams. After the platform has fed completely through the machine, then operation of the motor 52 is interrupted. The jig and its associated parts are withdrawn from the machine and axially turned 180° so that the secured slats now extend in a lower plane than those which have been attached to the beams by nails or other equivalents. The entire operation is thereupon repeated.

Thus, among others, the several objects of the invention as specifically aforenoted are achieved. Obviously numerous changes in construction and rearrangements of the parts may be resorted to without departing from the spirit of the invention as defined by the claims.

I claim:

1. In a machine of the character described in combination, means for supporting a pair of members to be secured to each other in superposed relationship, means for positioning a securing element adjacent the surface of one of said members, means for forming an opening within the second of said members in line with the path of progress of said securing element into the body of such member, means for advancing said element into the body of said second member and along such path, means for maintaining such opening-forming means in position during that advance, whereby said element will engage said forming means and have part of its body obstructed and diverted thereby from that path, and means for thereupon withdrawing such forming means.

2. In a machine as defined in claim 1, said openings forming means comprising a drill, and means for rotating and advancing said drill with respect to the second of said members to position said drill to obstruct said element.

3. In a machine as defined in claim 1, additional means for providing an opening in said one member in line with the path to be followed by said securing element, and means for operating said additional means prior to the advancing of such element through that member toward said forming and obstructing means.

References Cited in the file of this patent

UNITED STATES PATENTS

| | | |
|---|---|---|
| 183,670 | Heyl | Oct. 24, 1876 |
| 791,287 | Perkins | May 30, 1905 |
| 911,676 | Pearson | Feb. 9, 1909 |
| 920,290 | Eklund | May 4, 1909 |
| 2,497,737 | Norrefeldt | Feb. 14, 1950 |
| 2,582,782 | Kagefors | Jan. 15, 1952 |
| 2,764,758 | Schafroth | Oct. 2, 1956 |
| 2,834,016 | Stedler | May 13, 1958 |